N. H. MOTSINGER.
ROTARY ENGINE.
APPLICATION FILED NOV. 8, 1909.
960,991.
Patented June 7, 1910.
3 SHEETS—SHEET 1.
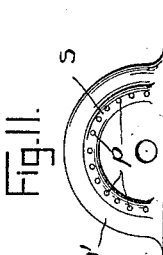
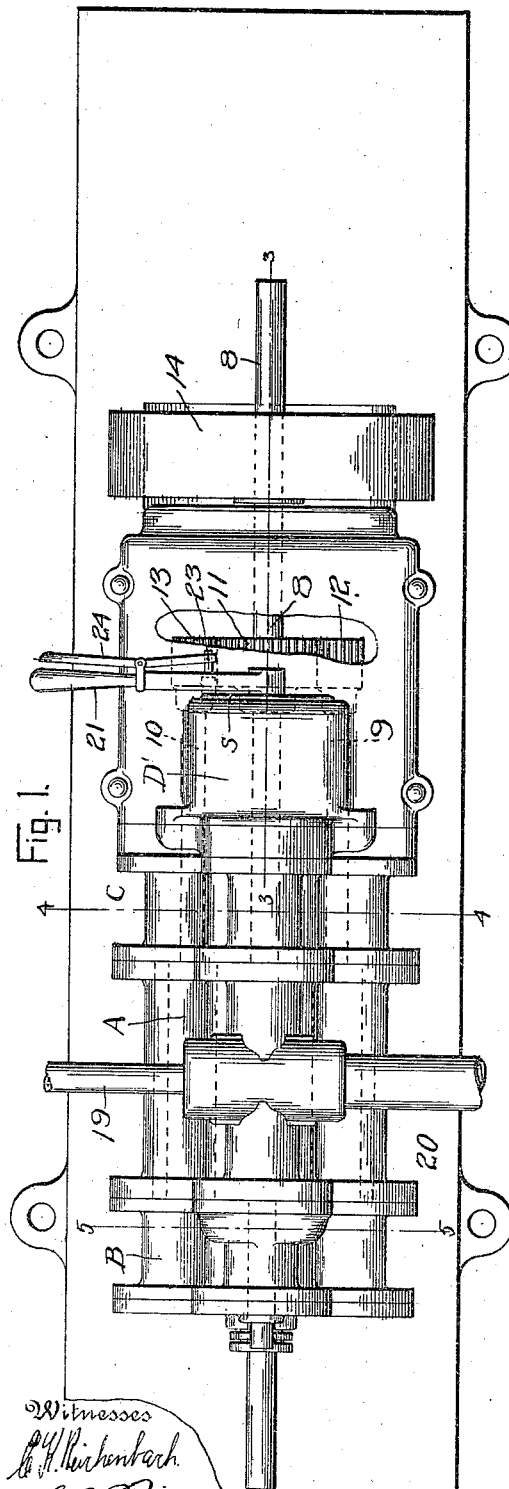
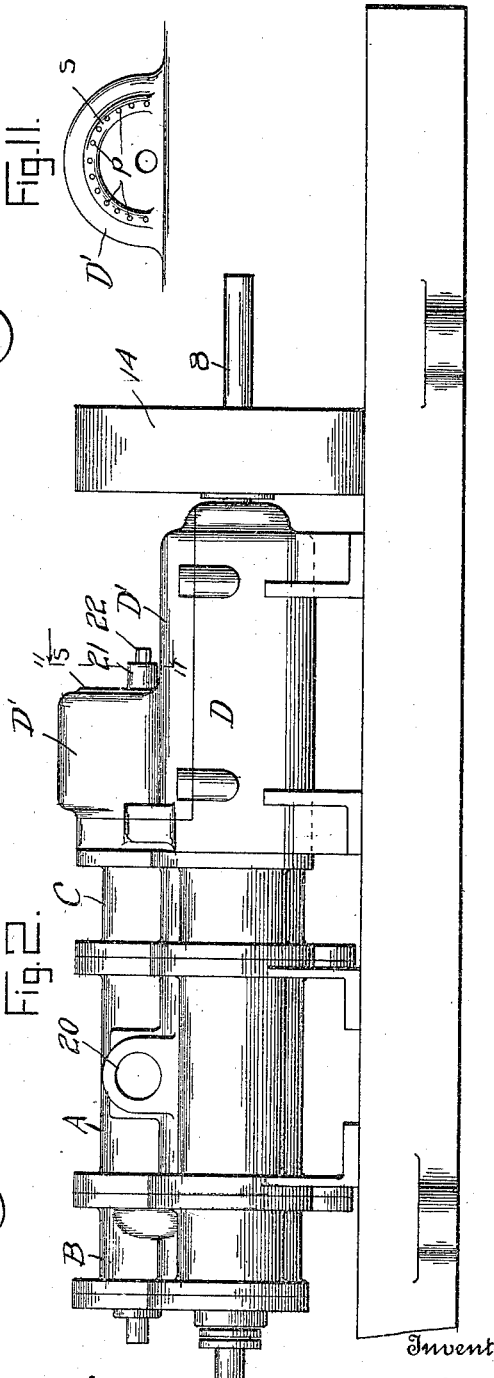
Witnesses
Inventor
Newell H. Motsinger,
By
Attorney N. H. MOTSINGER.
ROTARY ENGINE.
APPLICATION FILED NOV. 8, 1909.
960,991.
Patented June 7, 1910.
3 SHEETS—SHEET 2.
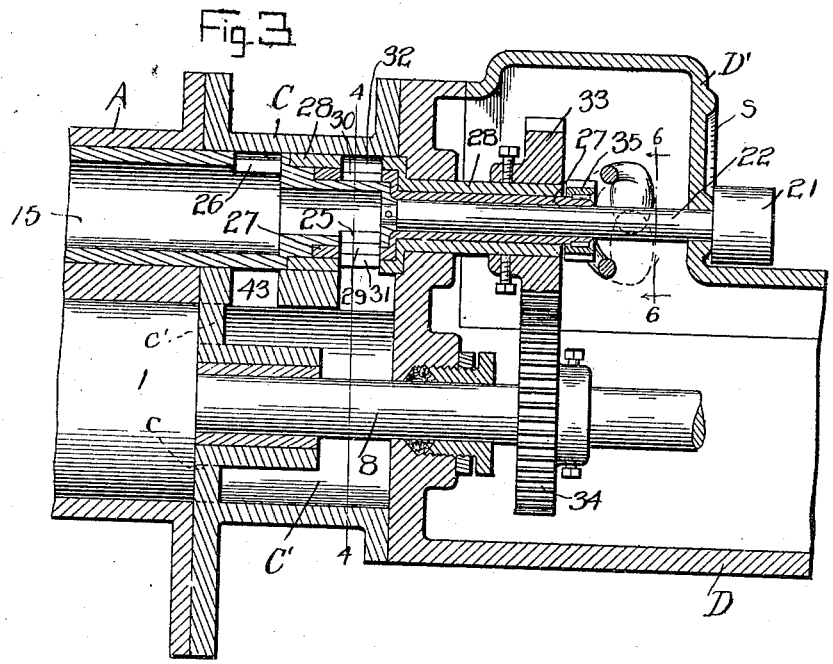
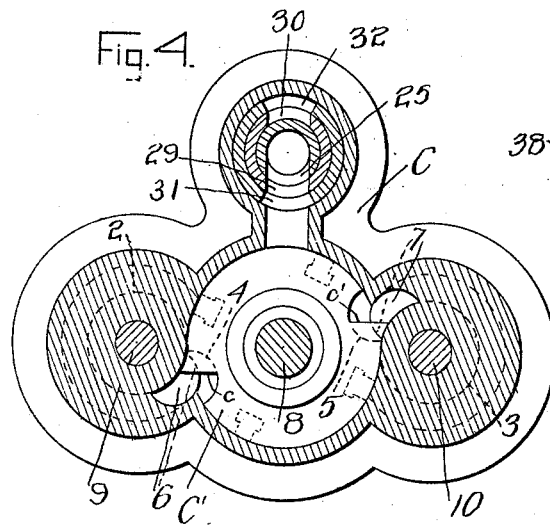
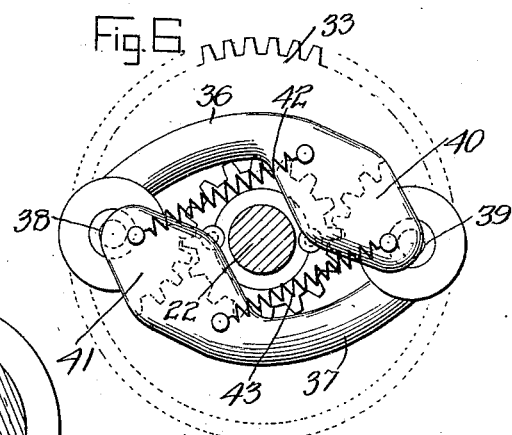
Witnesses
C. K. Reichenbach
L. A. Price
Inventor
Newell H. Motsinger,
By E. W. Bradford
Attorney N. H. MOTSINGER.
ROTARY ENGINE.
APPLICATION FILED NOV. 8, 1909.
960,991.
Patented June 7, 1910.
3 SHEETS—SHEET 3.
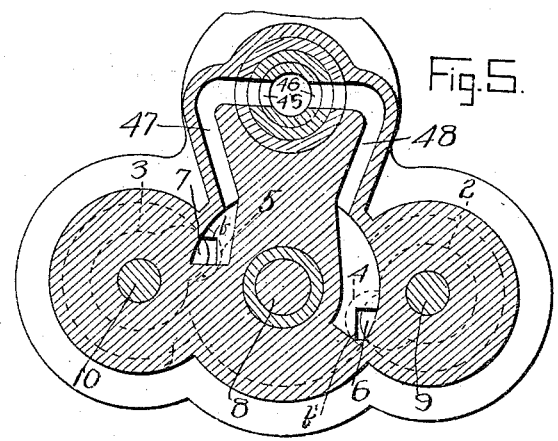
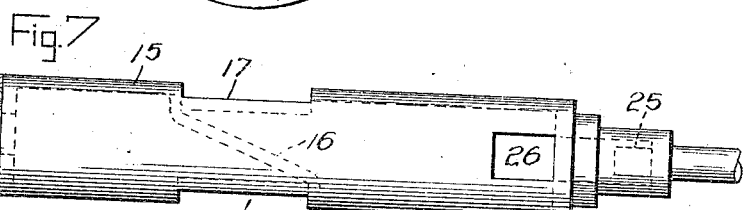
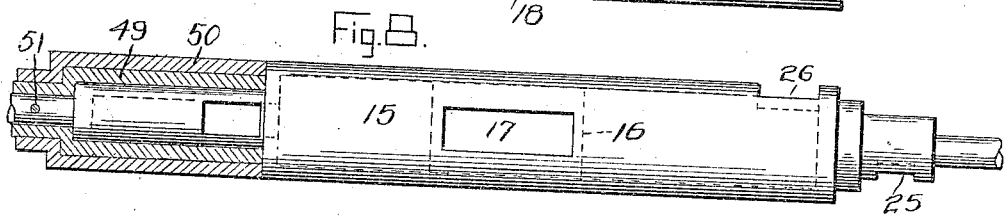
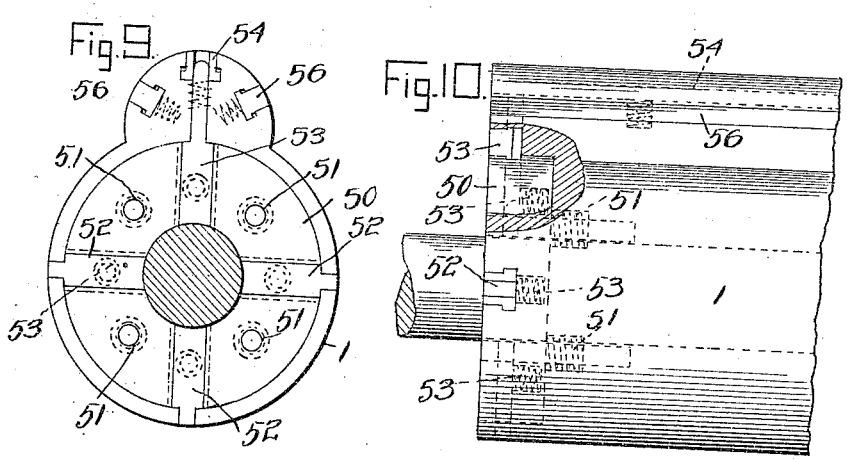
Witnesses
C. K. Reichenbach
L. A. Price
Inventor
Newell H. Motsinger,
By E. W. Bradford
Attorney

UNITED STATES PATENT OFFICE.

NEWELL H. MOTSINGER, OF GREENSBURG, PENNSYLVANIA.

ROTARY ENGINE.

960,991.  Specification of Letters Patent. Patented June 7, 1910.

Application filed November 8, 1909. Serial No. 526,894.

*To all whom it may concern:*

Be it known that I, NEWELL H. MOTSINGER, a citizen of the United States, residing at Greensburg, in the county of Westmoreland and State of Pennsylvania, have invented certain new and useful Improvements in Rotary Engines, of which the following is a specification.

My said invention consists in various improvements in the construction and arrangement of parts of rotary engines of that general class shown and described in my application No. 477,225, filed Feb. 10, 1909, whereby the construction is simplified and the operation of the engine improved and rendered more economical, all as will be hereinafter more fully described and claimed.

Referring to the accompanying drawings which are made a part hereof and on which similar reference characters indicate similar parts, Figure 1 is a top or plan view of a rotary engine of my improved construction, Fig. 2 a side elevation of the same, Fig. 3 a vertical central section through one end of the engine on the dotted line 3—3 in Fig. 1, Fig. 4 a cross section on the dotted line 4—4 in Figs. 1 and 3, Fig. 5 a similar view on the dotted line 5—5 in Fig. 1, Fig. 6 a detail view of the governor mechanism as seen when looking in the direction indicated by the arrows from the dotted line 6—6 in Fig. 3, Fig. 7 a top view of the reverse valve separately, Fig. 8 a side elevation of the same, Fig. 9 an end elevation of one of the side rotors, Fig. 10 a detailed side elevation thereof, and Fig. 11 a detail on the dotted line 11—11.

In said drawings the portions marked A represent the engine casing, B one of the cylinder heads, C the other cylinder, and D a gear casing. The casing A is a casting of suitable form to contain the bores for the three rotors mounted with their axes in the same plane and a fourth bore in a vertical line with the axis of the center rotor, in this instance shown above said rotor, or on the top of the engine. The head B is a casting of a form corresponding to the casing A and secured on the end thereof and is formed with a bore to receive the end of the reversing valve and with suitable ports and chambers for the control of the steam, as will be presently described. The head C is of similar formation secured to the opposite end of casing A and is formed with a bore for the end of the reversing valve and with suitable chambers and ports for the control of the steam. The casing D is a hollow casting mounted upon the outer end of the head C and adapted to contain the gearing connecting the several rotors, and the governor mechanism. It is provided with a top portion D' secured thereon and forming a completely inclosed chamber which may be filled or partially filled with oil so that the gearing will run in the oil and be thoroughly lubricated at all times.

The rotors 1, 2 and 3 are of substantially the same form and arrangement as shown in my above mentioned application, except that the center rotor 1 is of a larger diameter, preferably twice, arranged so that it will rotate one revolution to two revolutions of the side rotors. Said center rotor is formed with two longitudinal grooves 4 and 5 with which the vanes 6 and 7 on the side rotors 2 and 3, respectively, will engage, the vane on each side rotor engaging at one revolution with the groove 4 on the one side and at the next revolution with the groove 5 on the opposite side of said center rotor. The shaft 8 of said center rotor passes through the head C and through a stuffing box into the gear casing D, as shown in Fig. 3, and the shafts 9 and 10 of the side rotors also extend, in the same manner, into said gear casing. The center shaft 8 is provided with a large pinion 11 which meshes with small pinions 12 and 13 on the shafts 9 and 10 of the side rotors thus gearing said several shafts together so that they will revolve positively and in true relation at all times. The pinions 12 and 13, are, of course, of the same relative size to pinion 11 as the side rotors 2 and 3 bear to center rotor 1. The center shaft 8 extends through the end of the gear casing and is provided with a pulley 14 on the outside which may be connected by a belt to the load which the engine is intended to drive. Other suitable gearing may be substituted for the belt and pulley, of course.

The reversing valve 15 is mounted in the bore extending through the casing A and the heads B and C above the center rotor 1 and is formed as a hollow cylinder with a central partition or web 16 extending diagonally across said hollow cylinder to separate the ports 17 and 18 in opposite sides thereof so that one of said ports will communicate with one end of said reversing valve and the other of said ports will communicate with its other end. On the top of the casing A is formed a transversely extending part containing ports leading into opposite sides of the bore. A live steam inlet pipe 19 connects with one of said ports and a steam exhaust pipe 20 with the other. A reversing lever 21 is mounted on the outer end of a shaft 22 which is connected to the end of the reversing valve and projects through the gear casing D'. Said lever when in the position shown in Fig. 1 will hold the reversing valve in position so that one of its ports 17 or 18 will communicate with the steam inlet pipe and its other port with the steam exhaust pipe and when thrown to the opposite side of the engine, as will be readily seen, the position of said ports in relation to said inlet and exhaust pipes is reversed so that the course of the steam through the engine will be reversed and the engine run in the opposite direction. I have shown a pawl 23 on a lever 24 pivoted to the side of lever 21, said pawl being adapted to engage with any one of a series of perforations $p$ arranged on a segment $s$ on the end of the part D' of the gear casing. By adjusting said lever away from either of its extreme positions a portion of the area of the inlet and exhaust ports will be cut off, as the reversing valve will be turned in its seat so that its edges will project a distance over the ports leading in from the inlet and exhaust pipes.

An inlet port 25 is formed in the reversing valve near its outer end within the head C being in the lower side thereof when said reversing valve is standing in position to feed the steam to the engine through this end. An exhaust port 26 is formed in the opposite side and a short distance inside of the port 25. The outer end of the reversing valve is formed shouldered, or of different diameters, and a sleeve 27 is mounted to surround said end and another sleeve 28 to surround said inner sleeve 27 and extend over the shoulder against which the inner sleeve abuts. Said sleeve 27 is formed with ports 29 and 30 on opposite sides thereof and the sleeve 28 with ports 31 and 32, all of which are adapted to register longitudinally with the port 25 in the reversing valve. On the outer end of sleeve 28 is mounted a gear wheel 33 adapted to engage with a gear wheel 34 mounted on the shaft 8 of the center rotor. On the outer end of the sleeve 27, which extends a distance beyond the end of sleeve 28, is mounted a gear-wheel 35 to which the governor mechanism is connected. Said governor mechanism consists of arms 36 and 37 each pivoted at one end on opposite sides of the gear-wheel 33 on pivot bolts 38 and 39 respectively. On the inner side of its pivot each of said arms is formed with a projection having a toothed segment 40 and 41, respectively, which engage with the teeth on the pinion or gear-wheel 35 on the outer end of sleeve 27. The opposite ends of each of said arms are weighted and are connected by coiled springs 42 and 43, arranged with their tension adapted to hold the arms in contracted position, or the weights toward the center of the shaft.

The head C is formed with a chamber C' surrounding the shaft of the center rotor into which ports $c$ and $c'$ leading from the expansion chambers around the side rotors, communicate and another port 43 which is adapted to communicate with the port 26 when the reversing valve is turned to exhaust through this end of the engine. The ports $c$ and $c'$ are steam inlet ports in the engine with the parts in the position as shown. The opposite end of the reversing valve is also formed shouldered and with ports 45 and 46 on opposite sides thereof adapted to communicate with ports 47 and 48 leading to ports $b$ and $b'$ which extend into the head B from the steam chambers surrounding the side rotors. Sleeves 49 and 50 are mounted on this end of the reversing valve each being provided with ports in its opposite sides corresponding to the ports 45 and 46 in the reversing valve, as best shown in Fig. 5. The ports 47 and 48 leading into the engine through the ports $b$ and $b'$ at one end and into the reversing valve 15 through the ports 45 and 46 at their opposite ends are the only ports in head B, and serve to exhaust the steam from or feed it to each side of the engine, or each expansion chamber, simultaneously. The ports 45 and 46 will be regulated by the turning of the reversing valve correspondingly as are the ports 17 and 18 therein. When the governor mechanism is mounted on sleeves 49 and 50 it will operate exactly as described for the other end, the pin 51 being removed and used to secure sleeves 27 and 28 which will then be held to move only with the reversing valve.

The engine shown is intended to run chiefly in one direction, but these sleeves 49 and 50 are provided so that by transferring the governing mechanism from the opposite end to this end of the reversing valve the operation of the engine can be reversed permanently and run economically under the governor control. Said sleeves 49 and 50 are normally secured from rotation by a pin 51 which extends through them and through the shaft at this end of the reversing valve, locking them in position and with their ports registering with the ports 45 and 46.

In operation the parts being set in position indicated in the drawings the live steam comes through the pipe 19 into the reversing valve and passes to the right hand end of the engine through the port 25 therein and the ports 29 and 31 of the sleeves 27 and 28, respectively, into the chamber C' surrounding the shaft of the center rotor, within the head C and through the ports $c$ and $c'$ leading therefrom into the expansion chambers of the engine on both sides of said center rotor behind the vanes of the side rotors, where it expands and drives said rotors under the power thus generated. The steam being admitted simultaneously to both engines, and while they are in corresponding positions, balances the strain at all times, as each engine will have steam of the same pressure throughout its entire revolution, thus obviating the wear resulting from admitting the steam alternately to one engine and then to the other at different points in the revolution, in which case the steam pressure in the two engines is always different and constantly varying. The first admission of the steam will start the engine into operation and as the center rotor begins to revolve so will the outside sleeve 28, operating to alternately cut off and admit the steam through the ports 29 and 31. As the speed of the pinion 33 increases the governors will swing outward and through the toothed segment connection with the pinion 35 on the sleeve 37 will rock said sleeve to contract the ports 29 and 31 and reduce the amount of steam admitted. As the speed decreases the springs will operate to contract the governor and expand said openings thus governing the speed of the engine as may be desired. The steam passing through the engine expanding behind the vanes 6 and 7 of the side rotors transmits the power through the gears 12, 13 and 11 to the shaft 8 and through the pulley 4 thereon to the load to be driven. The exhaust steam escapes through the opposite end of the engine through ports $b$ and $b'$, 47 and 48, and 45 and 46, respectively, into the opposite end of the reversing valve through which it passes to the exhaust pipe 20.

In Figs. 9 and 10 I have shown an improved method of packing which consists in mounting in a recess formed in the end of the rotor an annular ring 50 which is held outwardly by coiled springs 51 mounted in seats underneath said ring. In said ring are formed radial grooves in which are mounted packing strips 52, which are held outwardly by springs 53 mounted in seats beneath them. A packing strip 54 is mounted in the crown of the vane and other packing strips 55 and 56 on opposite sides thereof, each of said packing strips being held outwardly by springs and adapted to slide radially a limited extent so that a perfectly steam tight joint is provided entirely around the rotors.

Having thus fully described my said invention, what I claim as new and desire to secure by Letters Patent, is:

1. A rotary engine comprising a reversing valve formed to receive the steam through one end and exhaust it through the other and provided with ports leading to the inlet and exhaust ends of the engine respectively, and an automatic governor and cut off comprising an inner and outer sleeve surrounding said reversing valve, said outer sleeve being geared to be driven by the engine and said inner sleeve connected with the governor mechanism, substantially as set forth.

2. In a rotary engine, the combination with the other mechanism, of a reversing valve comprising a hollow cylinder divided to receive the live steam at one end and the exhaust steam at the other and formed with ports communicating with the ports leading to the inlet and exhaust ends of the engine, of a governor and cut off mechanism comprising two independently revoluble sleeves mounted on said reversing valve one within the other, one geared to be rotated by the engine and the other connected with an automatic governor, substantially as set forth.

3. In a rotary engine, a reversing valve formed with ports at each end and to receive sleeves for governing and controlling the flow of steam through said ports and means connected with said sleeves for operating them, substantially as set forth.

4. In a rotary engine, the combination of the casing, a series of rotors mounted therein with their sides contiguous to the side rotors being formed and geared to rotate a multiple of the speed of the center rotor, steam inlet and exhaust ports, a reversing valve and governor mechanism arranged to admit the steam at one end to both sides of the engine simultaneously and exhaust it from both sides of the engine at the opposite end simultaneously, substantially as set forth.

5. In a rotary engine the combination of the casing, a series of rotors therein, the side rotors being arranged with their sides contiguous to the sides of the center rotor and to rotate a multiple of the speed of said center rotor, said center rotor being formed with longitudinal grooves and the side rotors with longitudinal vanes, the inlet and exhaust ports, steam controlling mechanism for admitting and exhausting the steam to both sides of the engine simultaneously, gearing connecting the shafts of the several rotors and means for taking the power from the shaft of said center rotor, substantially as set forth.

6. A rotary engine comprising a casing, a series of rotors therein arranged with their sides contiguous and formed with inter-meshing vanes and grooves, the engine being provided with inlet and exhaust ports arranged to admit the steam at one end and exhaust at its other end, the exhaust ports being at diametrically opposite sides of the axis from the inlet ports, steam controlling mechanism for admitting and exhausting the steam, and governing mechanism, all substantially as set forth.

7. In a rotary engine, the combination of the casing, rotors, reversing valve, the steam inlet and exhaust controlling mechanism, said rotors being formed with end packing consisting of annular rings set into said ends and held under yielding pressure and radial packing strips set into said rings and held outward under yielding pressure, substantially as set forth.

8. In a rotary engine, the combination with the other mechanism of the rotors provided with packing comprising outwardly held annular rings containing outwardly held radial strips, substantially as set forth.

9. In a rotary engine, the combination of the casing formed with bores for a series of rotors and another bore for a reversing valve, heads to said casing formed with ports leading from the expansion chambers surrounding the side rotors to the bore of said reversing valve which extends into said heads, said reversing valve mounted in the bore in said casing and heads provided therefor and formed with ports arranged to supply the live steam through one end thereof and to exhaust the spent steam through the other end thereof, one end being formed with ports leading directly from separate ports in said reversing valve to the ports communicating with the respective expansion chambers, and a governor for controlling the speed, substantially as set forth.

10. In a rotary engine, the combination of the casing formed with appropriate bores for the rotors and reversing valve and with ports for the inlet and exhaust of the steam, said reversing valve formed with ports adapted to communicate with said ports in said casing and also with the steam inlet and exhaust pipes, said steam inlet and exhaust pipes, and a governor on the end of said reversing valve comprising rotary thimbles one mounted within the other, one of which is geared to be driven with the engine and the other of which is connected to oscillating mechanism, and said oscillating mechanism, substantially as set forth.

11. In a rotary engine, the combination of the casing formed with appropriate ports for the circulation of the steam, the reversing valve formed with ports adapted to communicate with the ports in said casing, the steam inlet pipe communicating with one end of the reversing valve, the steam exhaust communicating with the other end, means for adjusting said reversing valve circumferentially and securing it in adjusted position, and governor mechanism mounted thereon and arranged to control the supply of the steam to regulate the speed of the engine, substantially as set forth.

12. In a rotary engine, the combination of the casing, the rotors mounted in appropriate bores therein, the center rotor being formed with longitudinal grooves and each of the side rotors with a longitudinal vane adapted to mesh with said grooves, one end being formed with ports leading independently and directly from the expansion chambers to one end of the reversing valve and the other end with other steam ports leading to the other end of the reversing valve, said reversing valve, and the governor mechanism, substantially as set forth.

13. A rotary engine comprising a reversing valve formed and arranged to receive the steam through one end and exhaust it through the other, governor mechanism mounted thereon comprising sleeves with radial ports adapted to register with the inlet port of said reversing valve, one of said sleeves being mounted within the other and adapted to rotate independently of the other, means for rotating one of said sleeves, and means for oscillating the other of said sleeves, substantially as set forth.

14. A rotary engine comprising a rotatable cylindrical reversing valve formed with inlet and exhaust ports and a division between them, a governor mounted on said reversing valve and consisting of sleeves or thimbles mounted one within the other and formed with ports registering with the inlet port of said reversing valve, means connected with one of said sleeves for rotating it, and means connected with the other of said sleeves for oscillating it, substantially as set forth.

15. A rotary engine comprising a reversing valve formed to receive and exhaust the steam and provided with sleeves upon each end thereof mounted one within the other, the sleeves upon one end being fixed while the sleeves at the other end are adapted to rotate, said several sleeves being formed with ports to register with the ports of said reversing valve, and interchangeable means for gearing one of said sleeves to rotate and the other of said sleeves to oscillate, substantially as set forth.

16. In a rotary engine, the combination of the casing formed with bores for the rotors and reversing valve, three rotors mounted with their axes in a horizontal plane in said bores, the reversing valve, said parts being formed with appropriate ports for the circulation of the steam, the shafts of said rotors extending through an inclosed gear box and geared together, said gear box formed oil tight to contain a supply of oil for lubricating said gears, and the shaft of the center rotor extending through said gear box to the outside for transmitting the power to the load, substantially as set forth.

In witness whereof, I have hereunto set my hand and seal at Washington, District of Columbia this 4th day of November, A. D. nineteen hundred and nine.

NEWELL H. MOTSINGER. [L. S.]

Witnesses:
 CHAS. E. RIORDAN,
 E. W. BRADFORD.